US006411392B1

(12) United States Patent
Bender et al.

(10) Patent No.: US 6,411,392 B1
(45) **Date of Patent: *Jun. 25, 2002**

(54) METHOD AND APPARATUS FOR DATA HIDING IN PRINTED IMAGES

(75) Inventors: Walter Bender, Auburndale; Daniel Gruhl, Cambridge, both of MA (US)

(73) Assignee: Massachusetts Institute of Technology, Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,639

(22) Filed: Apr. 15, 1998

(51) Int. Cl.[7] .............................................. G06K 15/00
(52) U.S. Cl. ...................................... 358/1.14; 382/100
(58) Field of Search ................................ 358/1.15, 1.9, 358/1.16; 382/100, 115, 135, 232, 278, 279; 380/210, 287, 54; 283/113, 901

(56) References Cited

U.S. PATENT DOCUMENTS 4,908,873 A * 3/1990 Philibert et al. ............ 382/100
5,483,602 A * 1/1996 Stenzel et al. .............. 382/135
5,486,022 A * 1/1996 Crane .......................... 283/83
5,509,691 A * 4/1996 Kaule et al. .................. 283/83
5,535,871 A * 7/1996 Harbaugh .................... 324/66
5,713,775 A 2/1998 Geis et al.
5,859,920 A * 1/1999 Daly et al. .................. 382/115
5,870,112 A * 2/1999 Kang et al. .................... 347/9

FOREIGN PATENT DOCUMENTS

WO WO96/36163 11/1996 ............ H04N/1/32

OTHER PUBLICATIONS

Anatol Z. Tirkel et al., Scientific Technology, "Image Watermaking—A Spread Spectrum Application", no publication date.

Walter Bender et al., Proceedings of the SPIE, "Techniques for Data Hiding", 1995.

Maxwell T. Stanford II et al., *"The Data Embedding Method"*, 1995.

David L. Hecht, Electronics and Imaging Laboratory, *"Embedded Data Glyph Technology for Hardcopy Digital Documents"*, vol. 2171, pp. 341–352, 1994.

* cited by examiner

*Primary Examiner*—Gabriel Garcia
*Assistant Examiner*—King Y. Poon
(74) *Attorney, Agent, or Firm*—Testa, Hurwitz & Thibeault, LLP

(57) ABSTRACT

A technique for embedding a mark in an a printed image allows its interpretation by an inexpensive printing system. Values of a characteristic parameter are altered in a portion of the host image confined to a thread, i.e. a region of contiguous points in the image, small enough to be included in the print space treated by the printer in a single pass of the printing head.

25 Claims, 3 Drawing Sheets

METHOD AND APPARATUS FOR DATA HIDING IN PRINTED IMAGES

FIELD OF THE INVENTION

This invention relates to steganography. More particularly, this invention relates to techniques for embedding a mark in a still image so that the bit string is detectable by a printing system.

BACKGROUND OF THE INVENTION

The appearance of commercial color photocopiers in the 1970's presented counterfeiters around the world with a powerful, widely accessible tool for creating passable reproductions of currency and other security documents such as treasury bills and airline tickets.

In the United States, this problem has been addressed with respect to currency counterfeiting through laws and import restrictions with the result that most color photocopiers have a circuit that applies simple feature recognition techniques to the image being photocopied to detect when a bill is being reproduced, and refuses to complete the task. The complexity of this task, its specificity to the features of a single type of bill, and the variations among different denominations all make this circuit easy to circumvent.

The proliferation of inexpensive color scanning and printing technology for personal computers in recent years has presented treasury departments with a new challenge. For example, an inexpensive system including a 720×720 DPI color ink-jet printer with a 300 DPI flatbed scanner can be used to create color reproductions that exceed the quality of color photocopiers costing more than a hundred times as much.

This development has brought about a need to enable a printing system including an ink-jet printer to discern when it is printing a security document. A requirement of any data embedded in the document to this end would be that it not adversely affect image quality. At the same time, the data should be decodable without extensive or expensive computational resources, since the goal would be ultimately to integrate the decoder into the printer itself Also, for analysis, the bits should be detectable after digitizing by a flatbed scanner of typical consumer resolution, currently 600 DPI or less.

Enabling such an ink-jet printer to determine when it is processing a scanned version of a security document in a manner that would allow it to refuse to reproduce the document differs fundamentally from the analogous problem for a photocopier. An ink-jet printer handles data for only a small number of lines, corresponding to one or two traverses of the printing head, at one time. A consumer ink-jet typically prints a quarter-inch band across an 8.5-inch path length in a single pass. Ideally, any technique should require image data from only one pass at a time.

Furthermore, the scan-print sequence used in falsifying documents with these consumer devices subjects the document to be reproduced to nonlinear modifications not necessarily introduced by photocopying. Such modifications are first introduced into a document to be reproduced during the creation of its RGB representation during scanning. The resulting scanned image is characterized by one resolution and, generally, some translation and rotation with respect to the origin of the print field. This digitized image may then be intentionally modified by a counterfeiter intending to obscure any embedded marking using specialized software. Finally, further nonlinear modifications are introduced during printing by an ink-jet printer in the form of spatial resolution lost to dithering in order to enhance the color depth obtainable from the four to seven ink colors in its palette.

In terms of data hiding, this situation differs from the traditional information hiding problems. Typically for images, data hiding techniques are designed with the understanding that the quality of a test image might be largely degraded compared to the original unaltered host image in terms of signal-to-noise ratio through perceptual coding methods such as JPEG; that arbitrary resampling might have been done through scaling; is and that cropping is a possibility. Most commercial systems also presuppose that a test image presented to the decoder has not been rotated with respect to the host image; often such systems require the test image to be untranslated as well. Furthermore, it is often assumed that the test image will be in a similar color/luminance space—RGB v. CMYK, for example—as the original host image.

By contrast, data hiding for preventing and detecting counterfeiting of security documents is constrained by an almost complementary set of circumstances. An offender is motivated to create a reproduction that looks as much as possible like a legitimate document before trying to pass it. Thus the quality of the reproduced image that would serve as a test image is usually excellent; the size and scale of the reproduction is fixed. On the other hand, there is no reason, from the point of view of a forger, not to print out a falsified document oriented 45 degrees from the paper's edges or at some arbitrary position on the page, especially if such a simple alteration will allow a fraud to escape detection by the printer.

SUMMARY OF THE INVENTION

The invention embeds a mark in a host image in a manner that allows its interpretation by a printing system that operates by processing image data in subsegments corresponding to less than the entire image, such as an ink-jet printer. Specifically, values of a characteristic parameter, such as luminance and/or chrominance, are altered in a portion of the host image confined to a thread, i.e. a region of contiguous points in the image, small enough to be included in the print space treated by the printer in a single pass of the printing head. (Note that as used herein, the term "pass" refers to the movement of the print head involved in printing one continuous band or region of the image, across the image, or a fraction thereof, even if the print head technically makes more than one traverse over this area, such as may occur with some interleaving techniques.) This configuration allows an inexpensive printer, for example, to be programmed to determine whether a specific mark has been encoded in a test image. Thus it can refuse or continue to print the image accordingly, without having specifically to recognize the document (for example, as a $20 bill) or its class (for example, as United States currency).

Preferably, the encoding is repeated in several threads in the image, in varying orientations, thereby minimizing the probability that detection of the mark will be circumvented simply by changing the orientation at which the bill is scanned or printed. The number of repetitions and their orientations necessary to maintain the integrity of the system depends on the geometry of the image, the width of the threads and the width of the printhead.

The invention is not limited to any particular encoding algorithm or internal thread substructure. Space-domain, spread-spectrum techniques, well known in the art, and the statistical approach ("Patchwork") outlined in U.S. Pat. No. 5,689,587, herein incorporated by reference, are two types of methods useful for documents such as are the targets of counterfeiters, owing to the lack of resealing anticipated during illicit reproduction of these documents. However, virtually any technique compatible with the reduced accuracy of encoding—resulting from the small encoding area for an individual bit—can be used. In particular, the technique should return all possible bit values with equal probability when analyzing an unencoded region. The properties of a host document will influence the optimum encoding algorithm for a given document.

For example, the engraving on a bill of United States currency effectively camouflages alterations introduced by spread-spectrum types of encoding techniques. Thus, in a preferred embodiment, a thread is an elongated area of the host image subdivided into several regions, in each one of which a single bit is encoded by altering characteristic parameter values using conventional one-dimensional direct-sequence spread-spectrum techniques, as are well known in the art. Such techniques incorporate the data in the pixel domain as a modulation on a carrier function which is also multiplied by a pseudo-random series and then added to the host image pixel parameter values. For example, in one technique of this type, the carrier function may be phase modulated, the value of the phase shift indicating the bit value.

On the other hand, Patchwork may be used to embed a mark comprised of several bits by alterations distributed throughout a thread having no internal microstructure, due to the orthogonality of bits embedded using Patchwork; or, regions, each encoding several bits, may be defined in the thread. In this case, the embedding is done by first randomly selecting a large number of locations in the thread, for example by associating locations in the thread with members of a pseudo-random number series. A subset of locations is allotted for each bit to be embedded, and the locations in each subset are partitioned into first and second groups. Then to encode one bit value, the host image is altered by increasing the values of the characteristic parameter at locations belonging to the first group and decreasing the values of the same parameter at locations belonging to the second group; to encode the other bit value, the first group parameter values are decreased and the second group parameter values are increased. The increment by which the parameter value at any location in the subset is altered may be adapted to minimize the visibility of the encoding; for example, alteration at some locations may be waived, effectively receiving an encoding depth of zero.

Decoding entails determining whether or not a test image includes the embedded mark. A test area is defined in the test image, either by mapping onto the test image a domain having the same dimensions and, under ideal conditions, orientation as the thread defined in the encoded host image. Or, the test area is simply defined by the print line of a printer handling the test image. Sections corresponding to any regions identified in the host image during the embedding process may also be delineated within the test area. The parameter values of locations in the thread are processed so as to generate data which can be interpreted as a certainty level that the mark has been embedded. For example, to identify a mark embedded using a direct-sequence spread-spectrum technique, in each section the parameter values are multiplied by corresponding pseudo-random values, the carrier modulation is identified and the section is accordingly assigned a bit value and confidence level.

To read a mark embedded using a Patchwork technique, the selection, allotment and partition of locations generated during the embedding process is recreated in the test image, for example, by supplying a key specific to the bit string to a pseudo-random number generator and then applying the allotment and partition procedures. The decoder then calculates for each bit an experimental value of a test statistic, formulated to reflect the alterations to the thread associated with the statistic, of the parameter values assessed at the allotted locations in the test image thread. Generally, the test statistic is equivalent to a linear combination of many instances of respective functions of the parameter values of locations belonging to the first and second groups, for example, the difference between the sums of the parameter values over the first and second group locations. For each bit, the experimental value of the test statistic is interpreted in terms of whether it indicates operation of the probability distribution function associated with one bit value or with the other.

In both cases, the resulting bit string in the test image is compared to the bit string known to be encoded in the host image. A binomial point distribution function can be calculated to indicate the overall likelihood that the test image has been embedded with the mark of interest. The decoder refuses to print or to continue printing the test image if the likelihood exceeds some predetermined threshold. The likelihood of encoding may be calculated after the entire thread has been decoded, or, preferably, the likelihood is determined periodically as decoding progresses based on the decoded portion of the bit string and its confidence level.

Although the mark embedded by the invention is generally characterized herein as a bit string, the invention is not limited to this mode. Even if the mark includes a string of several bits, for the purposes of this document, decoding or responding to the mark may in practice entail confirming the value of only one bit of the string, if the identification can be made to a sufficiently high certainty. If at any point the decoder has accumulated enough evidence of encoding of the mark to satisfy some predeterminal certainty criterion, this process may be terminated, even if less than all of the available data associated with a single bit has been processed.

The invention is not limited to digital images. In addition to embedding by directly altering pixel values in a host image in electronic format, which can then be printed, the invention allows for the encoding to be independently generated and superposed onto an existing hardcopy document. A printing system configured to prevent printing of an encoded document may be controlled by a computer, cooperating with a printer containing the decoder; or the decoder may be integral to the printer. Or, the encoding may be incorporated into other methods of creating documents. For example, an engraving plate used in the production of a bill of United States currency could be fashioned so as to impose the parameter alterations embedding the mark. The mark would be detected during ink-jet printing of an illegitimate copy after scanning of the engraved original.

Thus, the invention provides methods for embedding and decoding marks in images to be printed, particularly suited for preventing and detecting counterfeiting of currency and other security documents (for example, treasury bills, stock certificates, bearer bonds) and identification documents (such as birth certificates, driver's licenses, passports, social security cards). In related aspects, the invention also provides an apparatus for embedding a mark in an image according to the method; an apparatus for determining whether a test image to be printed contains a mark embedded according to the method; an image created by embedding a mark in a host image according to the method; and a printing system for processing data representing a test image and optionally printing the test image according to whether the data contains a mark of interest.

BRIEF DESCRIPTION OF THE DRAWINGS

The invention description below refers to the accompanying drawings, of which.

DETAILED DESCRIPTION OF ILLUSTRATIVE EMBODIMENTS

Figure 1A:
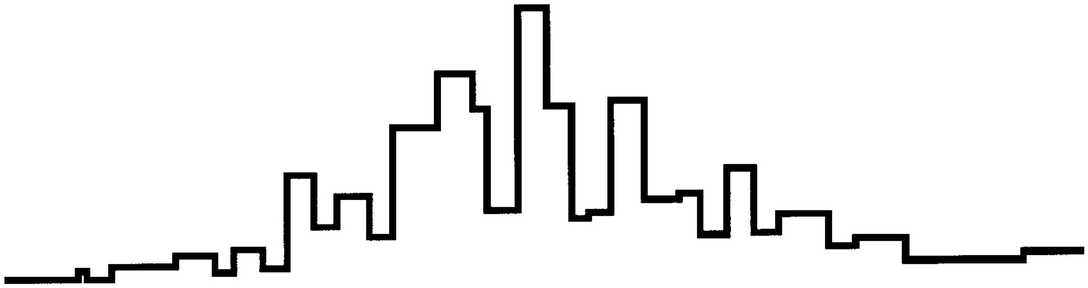
FIGS. 1A–1B graphically depicts patch contours for a random cone patch.

Embedding data using spread-spectrum techniques is well known in the stenographic art. [See, e.g., M. K. Simon et al., *Spread Spectrum Communications Handbook*, McGraw-Hill, 1994 and R. C. Dixon, *Spread Spectrum Systems*, second edition, John Wiley and Sons, 1984. ] In an exemplary one-dimensional direct-sequence spread-spectrum embodiment, a one-pixel-wide thread is defined in a host image and divided into regions which are each to be encoded with a single bit value equal to 1 or 0. The bit string to be encoded in the digital host image is represented by a data function which has value 1 over pixel values to be encoded with a bit value of 1 and value−1 over pixels to be encoded with a bit value of 0. The data function changes value at integral multiples of a data rate $X_b$ along the pixel axis. Multiplying the data function by a sinusoidal carrier function phase modulates the sine wave by introducing a phase shift of $\pi$ over regions where the data function has value−1. Direct-sequence spread spectrum techniques may alternatively use other types of modulation, for example of frequency or amplitude, to embed data in the carrier.

A chip function has value of either 1 or −1 which changes randomly at integral multiples of a chip rate $X_c$ which typically has a value only $10^{-3}$ to $10^{-5}$ times $X_b$. Multiplying the modulated carrier by the chip spreads the energy of the carrier across the frequency spectrum. To embed the bit string, this spread and modulated carrier function is added in pixel space to a sequence of parameter values characterizing one pixel line in the host image. After this alteration, the parameter values are rescaled.

The line of pixels may be encoded with the same phase along entire length of the thread. Alternatively, the line of pixels is divided into regions along its length. The same encoding may be repeated on additional, parallel pixel lines. The thread optionally contains additional regions, similarly encoded, across its width. The same chip may be used in all regions, although the use of more than one chip in the thread reduces the visibility of the encoding.

The resulting encoded image bears a mark recognizable by a complementary printing system, equipped to decode the bit string, as a flag that the image should not be is printed. An attempt to print the image using such a printing system, for example after digitizing a legitimate hardcopy of the image with a scanner, will be terminated by the system.

Decoding a bit string so embedded first includes mapping onto a test image a boundary defining the thread and identifying sections arranged correspondingly to any regions identified in the host image during embedding. Then, distinguishing the bit values can be accomplished by multiplying the pixel parameter values in the test image by the corresponding chip values, which effectively spreads the original host image pixel values and despreads the modulated carrier in frequency space. The fourier transform of the despread modulated carrier for each section can then be examined to determine whether or not the carrier phase has been shifted and accordingly assign a bit value to the section.

Identifying sections may merely involve the decoder's distinguishing one line of pixels from another and need not encompass any more explicit mapping. If more than one chip sequence was used over the thread, each sequence may be tried in each region rather than requiring the decoder to contain the assignments of chips to regions.

These bit values constitute the test bit string. The probability that a given number k of matches between values in the test bit string and the bit string known to be encoded, out of a total of n pairings, would occur if the test bit string values were random, so that the probability of any single match is p=½, can be computed using the formula for the binomial probability density function $$p_k = \binom{n}{k}(p^k(1-p))^{n-k} = \binom{n}{k}\left(\frac{1}{2}\right)^n.$$

Since for a long bit string, the probability that any particular number of matches will occur is low, a more appropriate indicator of how unlikely the observed match is to be due to encoding is $$p_{>k} = \sum_{i=k}^{n}\binom{n}{k}\left(\frac{1}{2}\right)^n = \left(\frac{1}{2}\right)^n\sum_{i=k}^{n}\binom{n}{k}^n,$$

the probability that at least k of the n pairings yield a match. The decoder can terminate printing, for example, if the $P_{>k}$, based on the entire string or some fraction of it, falls below a certain predetermined value. However, the invention may incorporate other types of criteria for determining whether the test bit string and the encoded bit string match.

Misalignment of the document in scanning will introduce error into the pixelwise registration of the thread and of the section boundaries defined on the test image with the thread and sections defined on the host image during encoding. A human making an effort to align a document in a scanner typically does so only to within ⅛". This error generally effects a small translation and rotation of the pixel lines in the test image with respect to the original, so that the thread and regions defined by the decoder in a test image containing the bit string of interest contain different pixel values from the encoded host image. For this reason, the feature size used for encoding—the chip rate in the case of the example above or the patch dimension in the case of Patchwork—should be greater than a minimum size determined by the loss in resolution typically introduced by the scanning and printing devices. For example, the feature size is preferably no smaller than on the order of 1/10" for use with a scan/print system comprising a 300 DPI flatbed scanner and a 720×720 DPI color ink-jet printer.

To enhance the accuracy of the decoder in the presence of this type of error, each section is preferably many pixels long and several pixels wide. For example, in the case of a one-dimensional direct-sequence approach, the same encoding may be applied to each row of pixels across the width. In general, the wider the thread or regions thereof, the greater the overlap between the pixels designated by the thread and any regions defined on a misaligned test image and those included in the host image thread and its sections, and thus the more accurate the decoding. Larger threads also allow multiple sampling of the same thread.

In the case of the encoding algorithm described above, a small misalignment typically causes a shift in the decoded phase. For example, a decoder returns a phase indicating a shift of about 30° over sections for which the phase of the carrier function was unshifted. However, the phase shift returned for these sections are generally bracketed by a variation of only ±10°. If all phases are equally likely in an unencoded section, the probability of such clustering is infinitesimal. The tight bracketing could permit the use of more than two modulating phases; for example, the carrier function over each section could be shifted by one of four phases, each phase representing a pair of bits. Since all of the decoded phases are shifted in the same direction by roughly the same amount, this behavior can be exploited in calibrating the decoder by including several bits having the same value at the beginning of the encoded string. The decoder could use the phase returned for these sections to correct the phases returned for subsequent sections.

To enhance resistance to decoding errors due to misalignment caused by gross rotation or translation, the encoding performed in the thread is preferably repeated, in various orientations, in the image. This redundancy further increases the likelihood of overlap between the test and host threads. In general, a wider thread provides a level of redundancy with fewer repetitions, separated by greater angles, than a narrower thread can. In one embodiment, the printing system is capable of retaining at least some relatively small amount of information, such as a likelihood of encoding based on analysis of one swatch of pixels, from one pass of the print head into a subsequent pass. So, even if the probability of decoding calculated from analysis of one thread is not sufficient to terminate printing, it may contribute to such a verdict, based on some composite probability function and match criterion, in combination with data processed by the printing system in another pass.

The accuracy of decoding also depends on the depth of encoding, which in the case of the example above is the amplitude of the carrier function, and in the case of Patchwork is the patch depth. A larger amplitude can be applied to an image using a visibility mask, that selectively suppresses alteration of any pixel that would make the encoding noticeable, without adversely affecting the image than to one in which the image is altered according to the encoding scheme regardless of its visible effect on the printed image. For example, for encoding U.S. currency without any visibility mask, an amplitude of about 20 pixels is advisable for a 256-level linearly quantized pixel parameter; but with a mask, an amplitude of 40 pixels may be used.

In an exemplary embodiment using the Patchwork approach, described in detail in the '587 patent, a string of bits each having one of two values is encoded by altering the host image according to the following procedure: 1) designating for each bit to be embedded a sample set of pairs of randomly selected image locations $A_i$ and $B_i$ to be associated with the bit; and 2) to assign one value to the bit, increasing the parameter value $\alpha_i$ at each location $A_i$ in the sample set from its initial value $\alpha_i^\circ$ by some positive quantity $\delta_a$ and decreasing the parameter value $b_i$ at each location $B_i$ in the sample set from its initial value $b_i^\circ$ by some positive quantity $\delta_h$; to assign the other value to the bit, decreasing the parameter value $\alpha_i$ at each location $A_i$ in the sample set from its initial value $\alpha_i^\circ$ by some positive quantity $\delta_a$ and increasing the parameter value $b_i$ at each location $B_i$ in the sample set from its initial value $b_i^\circ$ by some positive quantity $\delta_h$.

Determining whether or not a test image contains the embedded bit string requires knowledge of the sample set for each of the bits, including which of the selected locations were designated $A_i$ and which were designated $B_i$. A convenient way of conveying this information to the decoder is to first generate the pairings using a key for a known pseudo-random number generator, for example by designating alternate numbers in the pseudo-random number series $A_i$ and $B_i$. Since calculation of the test statistic does not actually require pairing the locations, another possibility is to designate the first n numbers in the series as $A_i$ and the second n numbers as $B_i$. Knowledge of the key by the decoder then enables it to recreate the pairings.

For each bit, the decoder then calculates an experimental value of the random variable $S_n''$ representing the parameter differences between the two groups of locations due to encoding:

$$S_n'' = \sum_{i=1}^{n} (a_i - b_i) = \sum_{i=1}^{n} [(a_i^o + \delta_a) - (b_i^o - \delta_b)] = (\delta_a + \delta_b)n + \sum_{i=1}^{n} (a_i^o - b_i^o). \quad \text{equation 1}$$

For purposes of illustration, if the parameter at each location in the host image thread or region conforms to a 256-level linearly quantized system starting at zero with all values equally likely, the second term of equation 1 is zero, so that the expectation value $E(S_n'')$ in the altered host image for a sample set corresponding to a bit embedded by increasing parameter values for the first group and decreasing values for the second group is $$E(S_n'')=(\delta_a+\delta_b)n$$

Thus, for each pair of locations included in such a sample set, the expectation is shifted positively by $(\delta_a+\delta_b)$. For a sufficiently large sample size n, the expectation value of $S_n''$ is shifted positively with respect to zero by several standard deviations of the $S_n'$ distribution 10 of the unaltered host image. Therefore, for large n, there is insignificant overlap between the ranges of the $S_n'$ probability density function of the original host image and that of the altered image. For a sample set corresponding to a bit embedded by decreasing parameter values for the first group and increasing values for the second group, the $S_n'$ probability density function for the altered image is shifted negatively.

Thus, based on the value of the test statistic compared to the expectation value of the statistic in the unaltered host image, the decoder assigns a value to the bit. It may also is assign a confidence value to the bit based on the cumulative distribution function of the normalized shift in expectation value of the probability density functions introduced by the parameter value changes associated with each of the two bit values. The decoder can compare the decoded data with the encoded bit string and calculate a certainty of encoding for the entire bit string, as described above.

The generalization of the technique can be summarized as follows. For a single bit, the randomly chosen locations are divided into alpha and beta groups having respective parameter values $\alpha_j$ and $\beta_k$ which are respectively increased and decreased by encoding. It is not necessary that the sample set be decomposed into n distinct samples, of which each includes representatives from each group. Therefore, the numbers of locations belonging to the alpha and beta groups, J and K, may be unequal. Either of these groups may optionally encompass an arbitrary number of subgroups, each having its parameter values altered by a different magnitude by the encoding; and any subgroup may contain a number of locations different from the number contained by any other subgroup. The indicative experimental value S is equivalent to a linear combination of several instances of two arbitrary functions $f(\alpha_j, j)$ and $g(\beta_k, k)$, which are not necessarily linear functions. It must be emphasized that although the functions $f(\alpha_j, j)$ and $g(\beta_k, k)$ for the example already given has been the identity function, this is not at all necessary.

The details of encoding and decoding for this method or other methods used in this invention are influenced by the same considerations as discussed for the spread-spectrum technique such as visibility and accuracy of decoding. Large values of δ promote high confidence levels for bit value assignments, but the range of practical values is limited by the consideration of visibility of the alterations to the host image. Imposing a visibility mask increases the patch depth that can be used without making the alterations visible. In a digitally represented image, the locations at which the parameter values are adjusted may correspond to patches, each a region in the image including several pixels, rather than to ungrouped individual pixels. (In analog images, the distinction between points and patches is arbitrary.) The lower-frequency nature of patchwise encoding accommodates higher values of δ without drawing attention to the encoding. This approach provides more information for the decoder to exploit, for example by examining a 3×3 block of pixels around the patch-identifying pixel.

Figure 1B:
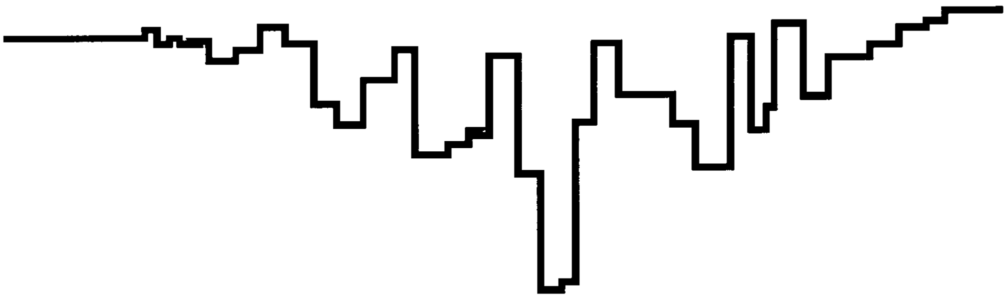

The patch depth δ need not be constant over the entire patch area. The contour of a patch (i. e., the variation of δ over the patch area) largely determines which spatial frequencies will by modified by the encoding. The ability to adjust parameter values over a multi-pixel area allows smoother variation in patch depth around the edges of the patch. This rounding takes advantage of the lower sensitivity (about 1 part in 40) of the eye to smoothly changing luminance values compared to its sensitivity (about 1 part in 240) to discontinuous changes in a region of otherwise uniform luminance. A random mask imposed on a smooth patch contour further decreases patch visibility. For example, FIGS.1A–1B shows δ as a function of position for random cone patch contours which increase and decrease, respectively, the parameter values of the patch pixels. This patch contour has a maximum depth at the center of the patch. Otherwise, δ is random across the patch, enveloped by a cone.

In one approach, the patches are selected from cells defined by a grid mapped onto the thread or section thereof so as to assign each pixel of the image to a cell. Then the groupings used to specify the encoded pattern designate cells, of which the parameter values of the member pixels are altered. In decoding, the parameter value at an arbitrarily chosen position, such as the centroid of the patch, can be used to represent the patch in the experimental value of $S_n$, since the parameter values of all of the points in the patch have been altered in the same direction. In a simple rectilinear lattice defining square cells, the resulting discontinuity in, e. g. luminance, is concentrated in the regions near the corresponding cell borders. If n is large, so that most of the cells define altered patches, this lattice symmetry promotes visibility of the encoding. The symmetry of a hexagonal grid makes the border regions between cells less obvious to the eye.

In another approach, the patches are scattered randomly across the thread. An arrangement of patches constructed around points randomly selected from all the points in the thread or section thereof minimizes the perceptible distortion introduced by encoding.

The use of patching also imparts resistance to errors due to misalignment for geometric considerations similar to those recommending wide regions. Patching allows is for overlap between altered locations so as to allow calculation of a meaningful test statistic even in the presence of some rotation and translation.

Figure 2:
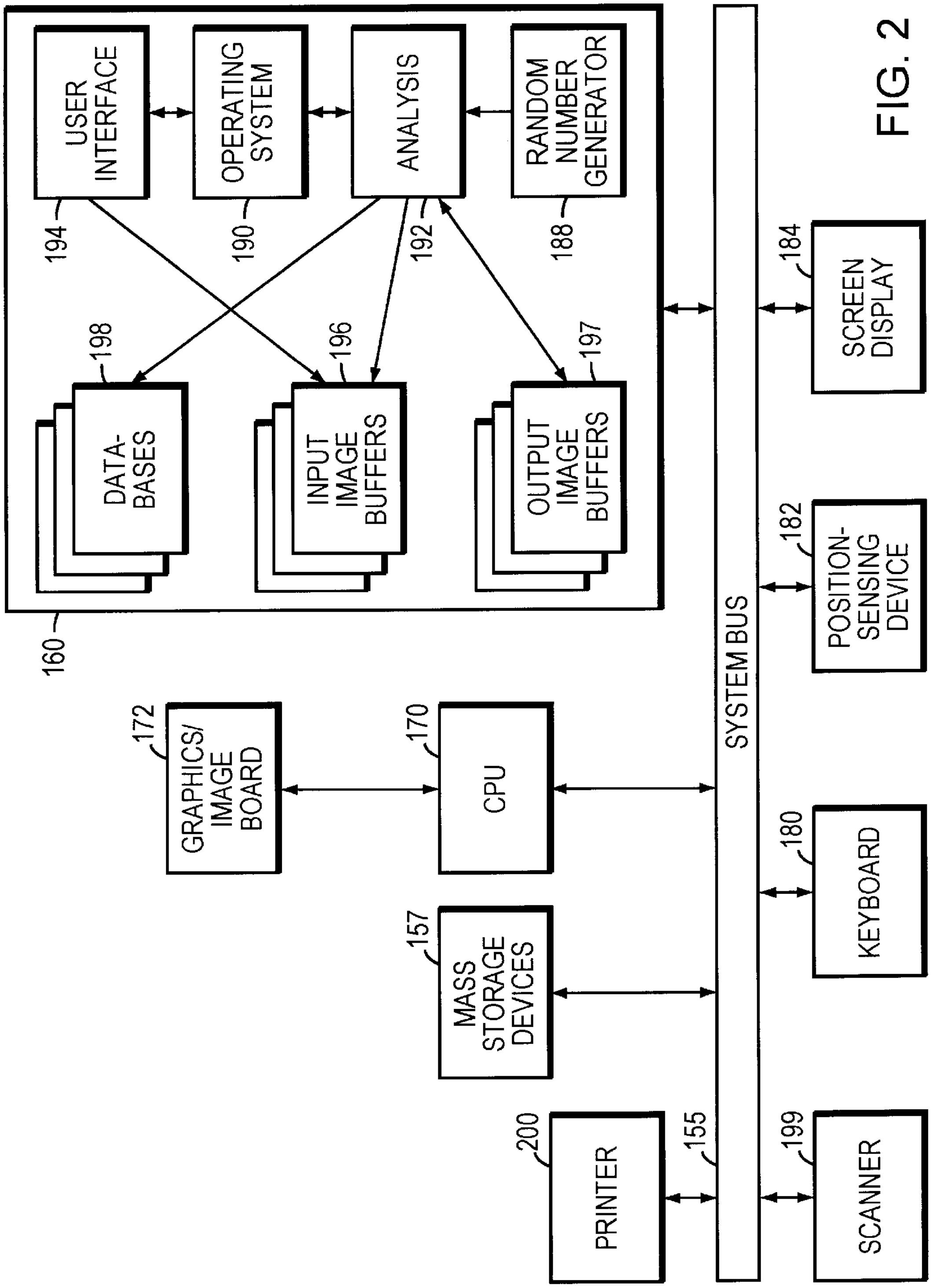
FIG. 2 schematically illustrates a representative hardware environment for the present invention.

Refer now to FIG. 2, which illustrates, in block-diagram form, a hardware system incorporating the invention. As indicated therein, the system includes a system bus 155, over which all system components communicate, a mass storage device (such as a hard disk or optical storage unit) 157 as well as a main system memory 160.

The operation of the illustrated system is directed by a central-processing unit ("CPU") 170. To facilitate rapid execution of the image-processing operations hereinafter described, the system preferably contains a graphics or image-processing board 172; this is a standard component well-known to those skilled in the art.

The user interacts with the system using a keyboard 180 and a position-sensing device (e.g., a mouse) 182. The output of either device can be used to designate information or select particular areas of a screen display 184 to direct functions to be performed by the system.

The main memory 160 contains a group of modules that control the operation of CPU 170 and its interaction with the other hardware components. An operating system 190 directs the execution of low-level, basic system functions such as memory allocation, file management and operation of mass storage devices 157. At a higher level, an analysis module 192, implemented as a series of stored instructions, directs execution of the primary functions performed by the invention, as discussed below: instructions defining a user interface 194 allow straightforward interaction over screen display 184. User interface 194 generates words or graphical images on display 184 to prompt action by the user, and accepts user commands from keyboard 180 and/or position-sensing device. A random number generator 186 creates the ordered series of pseudo-random numbers used, for example, to define the chip, as in the case of the spread-spectrum embodiment described above, or to specify patch locations, as in a Patchwork-based approach.

The main memory 160 also includes one or more input image buffers 196 that contain image(s), such as a host or test image, used as input for processing according to the invention and output image buffers 197 that contain an output image generated by that processing. The contents of each input or output image buffer define a "raster,"i.e., a regular two-dimensional pattern of discrete pixel positions that collectively represent an image and may be used to drive (e.g., by means of image-processing board 172 or an image server) screen display 184 to display that image. The values of pixel parameters, such as luminance, contained at each memory location in an image buffer 196 or 197 directly governs the appearance of a corresponding pixel on display 184.

One or more databases 198 contain encoding and/or decoding information, which, depending on the encoding algorithm used, may include, e. g., the placement and extent of the thread on the host image; the coordinates of boundaries between regions within the thread; the bit string to be encoded; the form of the carrier function, its amplitude; the data function; the chip rate; the output of the random number generator, the key used by it to generate the pseudo-random number series; the correspondence between numbers and locations, such as a pixel or grid cell, in an image; the rule governing assignment of pseudo-random numbers or patches to subsets and to the alpha and beta groups and any subgroups; the description of patches, including size, shape, arrangement and contour; the test statistic formulation, its expected value, and other details of its probability functions; and criteria for terminating printing.

One or more of the databases 198 may be associated with each one of the image buffers 196 or 197 and contain information specific to the image contained in the associated buffer; or, one database 198 may contain information generic to all images encoded or decoded by the apparatus. The databases may be stored in the mass storage device 157 in file(s) linked to file(s) containing the associated image(s).

It must be understood that although the modules of main memory 160 have been described separately, this is for clarity of presentation only; so long as the system performs all necessary functions, it is immaterial how they are distributed within the system and its programming architecture. Likewise, although conceptually organized as grids, pixelmaps need not actually be stored digitally in this fashion. Rather, for convenience of memory utilization and transmission, the raster pattern is usually encoded as an ordered array of pixels.

The host or test image may be provided in electronic or hardcopy format, in which case the image is processed by a scanner 199 before encoding or decoding. The digitized image is sent as bitstreams from the scanner 199 on the bus 155 to an image buffer 196 of the main memory 160. The source or test image may be stored in the mass storage device 157 as well as in image buffers 196. The printer 200 is controlled by the analysis module 192 to terminate printing of a test image when the embedded bit string is detected. The printer 200 may also be used to print the altered host image after encoding.

As noted above, execution of the key tasks associated with the present invention is directed by analysis module 192, which governs the operation of CPU 170 and controls its interaction with main memory 160 in performing the steps necessary to encode a mark in a host image or to detect and decode in a test image a mark so embedded. Although the system is shown with the printer 200 distinct from the computational elements, the combination comprising a printing system, the invention encompasses decoding systems that instead incorporate any of these into a printer.

Figure 3:
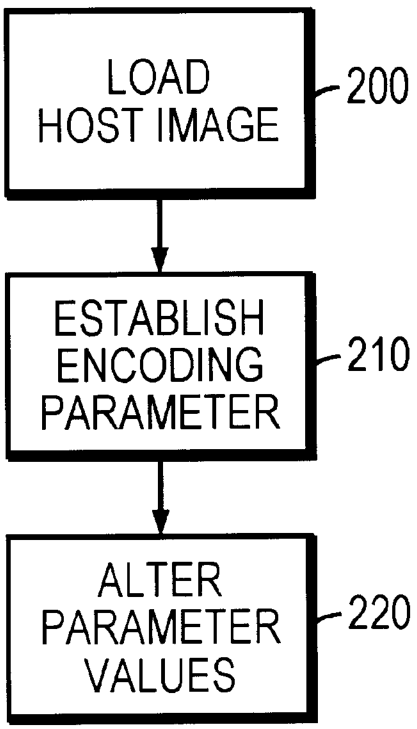
FIG. 3 is a flow chart illustrating encoding according to the invention.

In particular, the procedure followed by the hardware system for encoding a mark in a host image is shown in FIG. 3. In a first step 200, the host image is loaded into a first one of input image buffers 196, so that it is available to analysis module 192. Then the module 192 establishes the encoding parameters in step 210. These parameters may include any of the information described above in connection with the database(s) 198. In response to a user command, the module 192 either retrieves these parameters, from the user interface 194 or the appropriate database 198, or determines the appropriate parameters for encoding the host image based on the considerations outlined previously herein. The values determined for the parameters may be retained in one of the databases 198. In step 220, the module 192 generates an output image by altering the pixel parameter values of the locations in a manner dictated by the encoding algorithm used, according to the encoding parameters. The encoded output image is then stored in a second one of the output image buffers 197.

Figure 4:
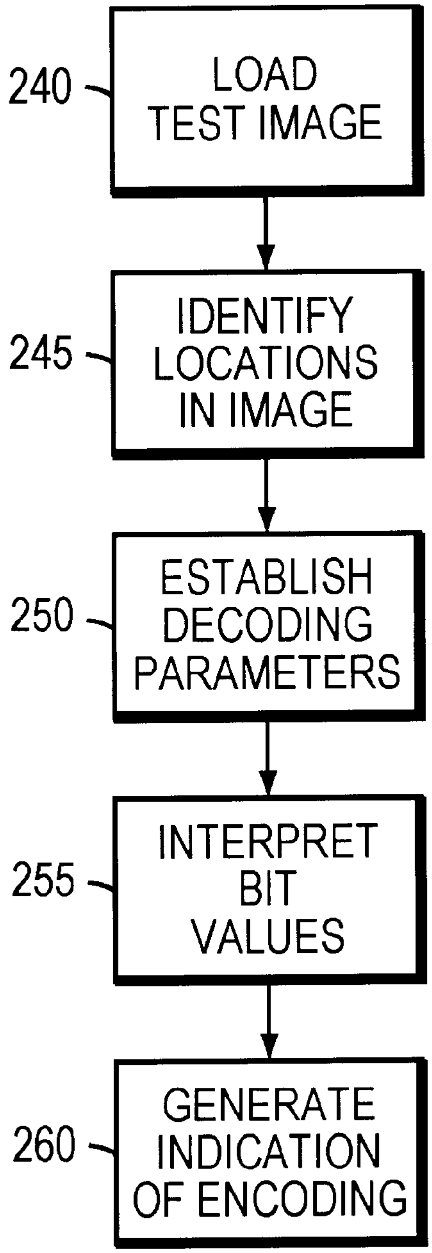
FIG. 4 is a flow chart illustrating decoding according to the invention.

As shown in FIG. 4, for identifying a mark in a test image, in the first step 240, the test image is first loaded into one of the image buffers 162. In step 245, the module 192 defines in the test image the thread and any sections and performs any necessary pixel or grid mapping. In step 250, the analysis module 192 establishes the decoding parameters which may include any of the information described above in connection with the database(s) 198. In response to a user command, the module 192 either retrieves these parameters, from the user interface 194 or the appropriate database 198, or determines the appropriate parameters for encoding the host image based on the considerations outlined previously herein. The values so determined may be retained in one of the databases 198. In step 255, the module 192 accesses the test image stored in one of the image buffers 162 and computes the manipulates the parameter values as dictated by the decoding parameters so as to interpret the contents of the thread as a bit string. In step 260, the module 192 generates an indication of whether or not the test bit string matches the bit string of interest. This indication may entail simply showing on display 184 a calculated figure of merit or probability that the bit string of interest has been embedded in the test image, but preferably includes instructing the printer to terminate printing the image.

It will therefore be seen that the foregoing represents a highly extensible and advantageous approach to embedding data to be detected by ink-jet printers, especially for detecting and preventing counterfeiting. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of embedding a mark in a host image comprised of points, each point having a parameter value, the method comprising the steps of:

a. defining in the host image at least one thread of contiguous points, the thread having a length and width;

b. creating an altered image by, for each at least one thread, altering parameter values in the thread so as to embed the mark, the thread in the altered image being digitizable to an electronic format so that the embedded mark is interpretable by a printer responsive to the mark, the width of the thread being sufficiently small to be printed by the printer in one pass, thereby containing the embedded mark so as to allow the printer to detect the mark during the one pass, the printer requiring at least two passes to print the altered image.

2. The method of claim 1 wherein the mark comprises a bit string.

3. The method of claim 2 further comprising the step of identifying regions within the at least one thread, the step of creating an altered image comprising, for each at least one thread, within each of a plurality of the regions, altering parameter values so as to embed a bit, the plurality of bits embedded in the plurality of regions constituting the bit string.

4. The method of claim 1 wherein the host image constitutes a bill of currency.

5. The method of claim 1 wherein the host image constitutes a security document.

6. The method of claim 1 wherein the host image constitutes an identification document.

7. The method of claim 1 wherein the printing system responds to the mark by refusing to print the altered image.

8. The method of claim 1 wherein the at least one thread comprises a plurality of threads, the threads being oriented differently from one another in the image.

9. The method of claim 3 wherein the step of creating an altered image comprises altering parameter values according to a direct-sequence spread-spectrum technique.

10. The method of claim 1 wherein the step of creating an altered image comprises altering parameter values according to a patchwork technique.

11. The method of claim 1 wherein the step of creating an altered image comprises altering parameter values using a feature size on the order of greater than 1/10".

12. A method for processing data in an electronic format representing a digitized test image to be printed in order to determine whether the digitized test image, electronically encoded as points, each point having a parameter value, contains a mark embedded according to the method of claim 1, the method comprising the steps of:

a. defining in the digitized test image a test area having a width, the width of the test area being sufficiently small to be printed by a printer in one pass, thereby allowing the printer to determine, during the one pass, whether the test image includes the embedded mark, the printer requiring at least two passes to print the test image; and b. generating from the parameter values in the test area an indication of whether the test image contains the mark.

13. The method of claim 12 wherein the mark is a bit string, the step of generating an indication of whether the test image contains the bit string comprising generating, for at least one bit in the string, a respective indication of whether the test image contains the respective bit and generating the indication of whether the test image contains the bit string from the respective indication.

14. The method of claim 13 wherein indication of whether the test image contains the bit string is based on fewer than all of the bits embedded in the host image.

15. The method of claim 13 wherein the at least one thread has a plurality of regions identified therein, the parameter values within each region having been altered so as to embed at least one bit, the plurality of bits embedded in the plurality of regions constituting the embedded bit string, the step of generating an indication of whether the test image contains the embedded string comprising generating, for each of a plurality of the regions, a respective indication of whether the test image contains the at least one bit and generating the indication of whether the test image contains the bit string from the respective indications.

16. The method of claim 12 wherein the indication of whether the test image contains the mark is used by a printing system to determine whether the image is printed.

17. A printing system for processing data in an electronic format representing a digitized test image, encoded as points, each point having a parameter value, and optionally printing the digitized test image according to whether the data contains a mark of interest, the mark being encoded according to the method defined in claim 1, the printing system comprising:

a. a printer;

b. means for defining in the digitized test image a test area having a width, the width of the test area being sufficiently small to be printed by the printer in one pass, thereby allowing the printer to determine, during the one pass, whether the text image includes the embedded mark. the printer requiring at least two passes to print the altered image; and c. means for generating from parameter values in the digitized test image thread an indication of whether the digitized test image contains the mark of interest.

18. The printing system of claim 17 further comprising control means configured to refuse to print the test image according to the indication of whether the test image contains the mark of interest.

19. The printing system of claim 17 wherein the means for generating an indication of whether the test image contains the mark of interest resides in the printer.

20. An image created by embedding a mark in a host image comprised of points according to the method of claim 1.

21. An apparatus for embedding a mark in an electronically encoded image, the apparatus comprising:

a. a computer memory for storing the image as an ordered set of pixels, each pixel having a pixel parameter value;

b. means for defining in a host image at least one digitized thread of contiguous points, the thread having a length and width; and c. means for creating an altered image by, for each at least one digitized thread, altering parameter values so as to embed the mark in an electronic format, so that the embedded mark is interpretable by a printer responsive to the mark, the width of the thread being sufficiently small to be printed by the printer in one pass, thereby allowing the printer to determine, during the one pass, whether the text image includes the embedded mark, the printer requiring at least two passes to print the altered image.

22. An apparatus for determining whether a digitized test image to be printed by a printer, the test image being electronically encoded as points, each point having a parameter value, contains a mark [data] embedded according to the method of claim 1, the apparatus comprising:

a. a printer;

b. means for defining in the digitized test image a test area having a width, the width of the test area being sufficiently small to be printed by the printer in one pass thereby allowing the printer to determine, during the one pass, whether the test image includes the embedded mark, the printer requiring at least two passes to print the test image; and c. means for generating from the parameter values a respective indication of whether the test area contains the mark.

23. The method of claim 1 wherein parameter values of some points in the thread are not altered, based on expected visual perceptibility.

24. The method of claim 12 wherein the mark is a bit string, the step of generating an indication of whether the test image contains the bit string comprising generating, for a plurality of bits in the string, a respective indication of whether the test image contains the respective bit and generating the indication of whether the test image contains the bit string from the respective indications.

25. The method of claim 1 wherein parameter values are changed by an amount, the amount varying based on expected visual perceptibility.

* * * * *